United States Patent [19]
Strome

[11] Patent Number: 6,092,326
[45] Date of Patent: Jul. 25, 2000

[54] FISHING LINE STACKER

[76] Inventor: Daniel Edward Strome, 650 Cheapside Street, Unit 302, London, Ontario, Canada, N5Y 5G8

[21] Appl. No.: 09/170,010

[22] Filed: Oct. 13, 1998

[30] Foreign Application Priority Data

Oct. 21, 1997 [CA] Canada ................................ 2218773

[51] Int. Cl.7 .................................................. A01K 91/04
[52] U.S. Cl. ........................ 43/44.88; 43/17.2; 43/44.95; 43/43.12
[58] Field of Search .................... 43/17.2, 43.12, 43/43.1, 44.83, 44.84, 44.85, 44.87, 44.88, 44.95

[56] References Cited

U.S. PATENT DOCUMENTS

| 4,205,478 | 6/1980 | Emory | 43/44.85 |
| 4,453,336 | 6/1984 | Lowden | 43/43.12 |
| 4,856,224 | 8/1989 | Fincher, Sr. | 43/43.12 |

Primary Examiner—Jack W. Lavinder
Attorney, Agent, or Firm—R. Craig Armstrong

[57] ABSTRACT

A fishing line stacker is formed as a loop element carrying opposite resilient faces, the loop element allowing the fishing line to travel or extend through the loop portion of the stacker so that the stacker may freely float up and down the fishing line or, to be positioned between opposite resilient members and when tugged by the fishing catch or by a hook which is attached or connected directly or indirectly to the stacker to cause the stacker to slide releasing the fishing line from the nip of the resilient members into the free space defined by the stacker.

5 Claims, 3 Drawing Sheets

6,092,326

1

FISHING LINE STACKER

This invention relates to fishing line tackle. Particularly, the invention relates to a fishing line stacker suitable to be attached to a fishing line when used during troll fishing and more specifically, while also employing a downrigger allowing for a plurality of fishing line stackers to be releasingly attached to the fishing line, each stacker making either direct connection to a hook or the lure line to a hook.

It is an object of the invention to provide a fishing line stacker, which can be fixedly attached to a given elevational position on the fishing line so as to hold a fishing hook at that elevation but if the hook is snagged, as by a fish, the stacker moves to release the fishing line from fixed engagement into sliding engagement so that the stacker with lure and hook can travel up and down the fishing line in a free fashion. This allows easy dislodgement of the catch when the fishing line has a plurality of stackers which have snagged, with their respective hooks, fish.

The invention therefore contemplates a fishing line stacker, for releasing attachment to a fishing line being part of a fishing tackle system, the stacker providing fishing line releasable engagement means between the fishing line and a fishing hook, the stacker comprising a formed loop segment defining a free aperture, the loop segment extending into at least one opposite resilient member and further extending into means for connection to a fishing hook so that the fishing line may be threaded through the loop segment and constrainingly positioned between the resilient member and opposite arm so as to hold the stacker in a located position along the fishing line while, at the same time, allowing travelling movement of the fishing line into the free aperture of the loop when a predetermined force is applied to the fishing hook connected to the stacker thereby allowing the stacker to freely float up and down the fishing line.

In the preferred embodiment, there are two opposite cylindrical resilient members with a bevelled forward face and the positioning of the bevelled forward face will tend to cause the fishing line stacker to migrate up or down the fishing line, depending upon the relative position of the bevelled faces.

The invention will now be described by way of example and reference to the accompanying drawings in which.

Figure 1:
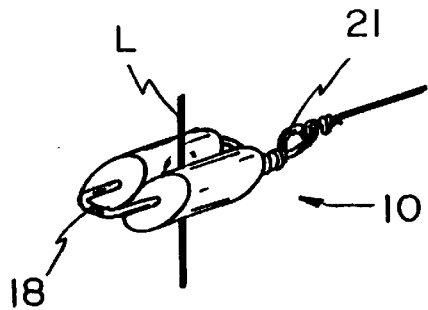
FIG. 1 is a perspective view of a fishing stacker, according to my invention.

Referring to FIGS. 1 through 4, a fishing line is generally shown a (L) and my novel fishing stacker as (10). The stacker (10) consists of a shaped steel wire (15) preferably hardened or an unoxidizable metal such as stainless steel, generally formed in the shape of the letter "U", with opposite arms (16) and (17), interconnected by a proximate arm (18). One opposite arm (17) extends into a bend (19) thence, into a straight closing section (20) to be overwrapped about and secured to an extended distal segment being an extended straight portion (16') of the opposite arm (16), in the fashion shown. The extended straight portion (16') is also wrapped onto itself to form a pigtail or eyelet (21) for attachment to a hook (H), or a lure line (40), in a fashion as will become apparent.

Figure 4:
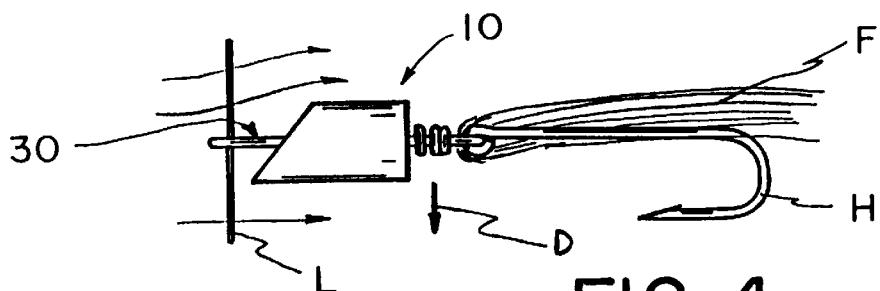
FIG. 4 is a side elevational view, like FIG. 2, showing the fishing line released from fixed grasp of the fishing stacker, according to the invention.

On opposite arms (16) and (17) are mounted touching cylindrical elements, preferably of resilient material such as rubber, having a forward bevelled face (23) and providing an aperture through the centre thereof so that the cylindrical elements may be frictionally rolled about each of their respective proximate arm (16,17). This affords an adjustable forward bevelled face (23) for each of the cylinders to permit water flow (arrows of FIG. 4) to either drive the stacker (10) upward or, as shown in FIG. 4, downward in the direction of arrow (D).

Figure 2:
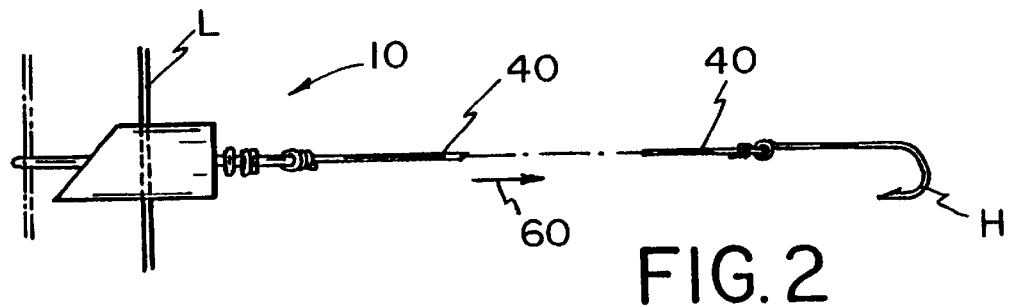
FIG. 2 is a side elevational view showing movement of the fishing stacker relative to the fishing line.
Figure 3:
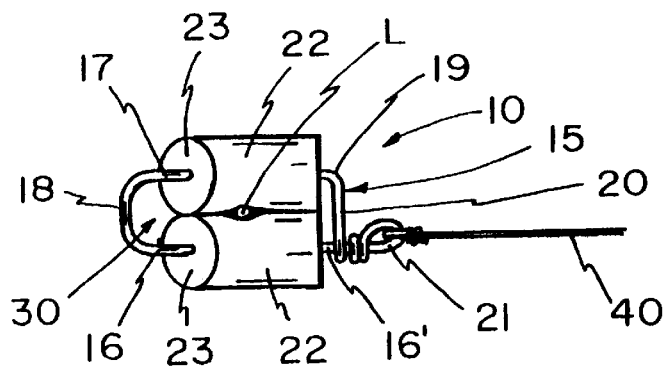
FIG. 3 is a top plan view showing the fishing line frictionally engaged in the fishing stacker.

Referring to FIGS. 1 and 2, the fishing line (L) is placed in that loop bounded by the forward bevelled faces (23), the opposite arms (16) and (17) and the proximate arm (18); an area designated as (30). Once in that position, the line (L), after the bait is put on a hook (H), shown in FIG. 4, it is pushed to be held between opposite elastomeric cylindrical elements (22) in the fashion shown in FIGS. 1, 2 and 3; and the elastomeric cylinders (22) accommodatingly deform, see FIG. 3, to frictionally engage and to tighten on to the line (L). The eyelet (21) of the stacker acts as the anchor point for direct connection to a hook (H), or to a lure line (40) carrying a hook (H) at its free end. It can be convenient for the hook to carry fish attracting fly members (F), as pictorially seen in FIG. 4, and that hook may be attached directly to stack (10) or at the end of a lure line (40).

Typically, one uses a downrigger generally shown as (50) consisting of a wire downrigger line (51) with at its lower end, a cannonball weight (52) which tends to hold the line (51) in essentially a vertical position while a boat (B) travels in its forward direction so that trolling can occur. In this respect, the line (51) of the downrigger (50) is normally attached through a turnbuckle or loop (53) to an appropriate harness on the boat.

Figure 5:
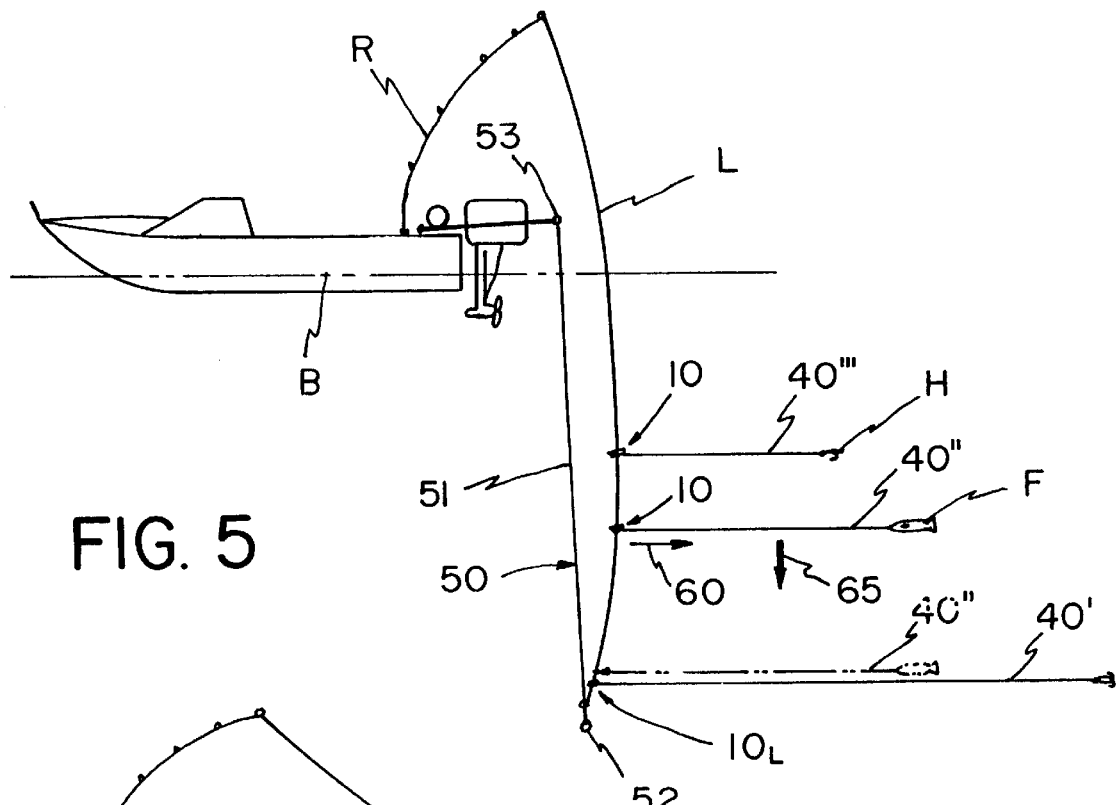
FIG. 5 and 6 are diagrammatic elevational representations of the utilization, in FIG. 5, of my invention with downrigger, and in FIG. 6 of my invention with downrigger released.

The distal end of the fishing line (L) is releasingly attached to the cannonball (52), in a conventional manner, and the line (L) therefore will follow, while trolling with the boat (B), downstream, as shown in FIG. 5, from the downrigger line (50).

A plurality of hooks (H) or lure lines (40) are appropriately tied to the pigtail (21) of a plurality of stackers (10) in a stepped elevated fashion, shown in FIG. 5 with the cannonball (52) at the lowest elevation in the water. Each stacker (10) is releasingly affixed to the line (L) by placing the line (L) between the friction engaging elastomeric cylinders (20) in the fashion shown in FIG. 3. Thus, referring to FIG. 5, a lure line (40) or stacker (10) may be positioned at different elevations relative to the cannonball (52). In the FIG. 5, there are two stackers elevated above that of the cannonball (52) while one lure line (40') is affixed to the cannonball (52), and to the end of the fishing line (L). and hence, to the cannonball (52). When a fish (F) is snared by a hook, and now referring to FIG. 2, it creates a drag (60) on the lure line (40') causing the line (L) to travel from the solid to the phantom line de-engaging itself from frictional engagement with the opposite cylinders (22) to float and occupy the free space (30) defined by portions of the opposite arms (16) and (17) and the proximate arm (18) with the bevelled faces (23) of the cylinders (22). The stacker (10)

is free to float and may be descend, at downward arrow (60) in FIG. 4, to occupy the phantom position shown in that figure. If the fish (F) fights hard then the lowest lure line (40') is released from the cannonball (52) and the downrigger system (50).

Figure 6:
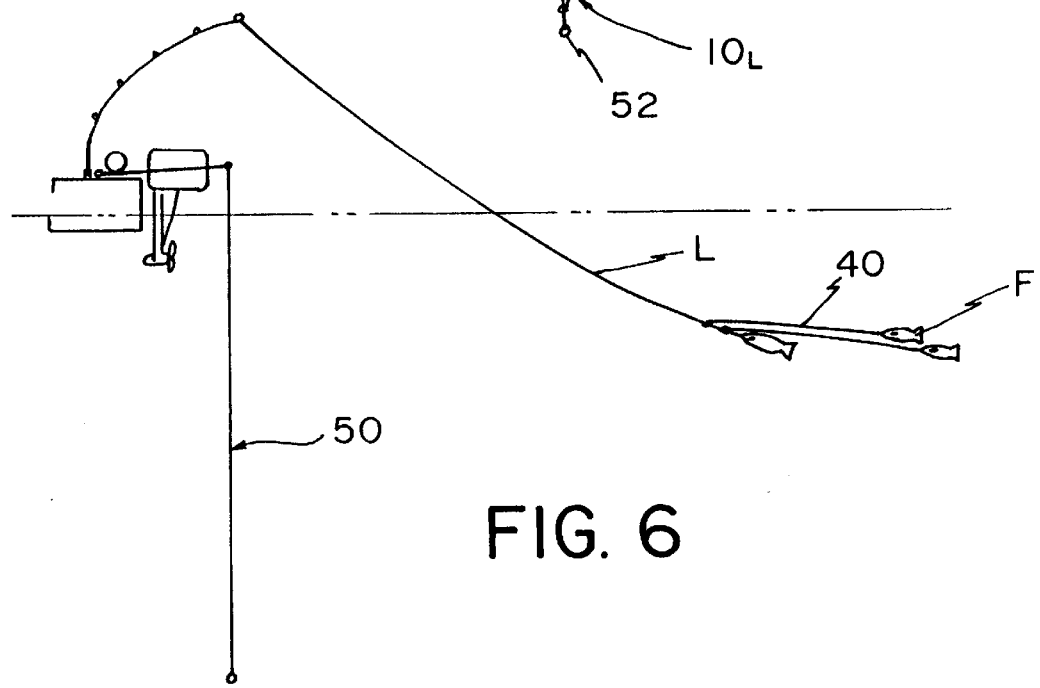

FIG. 6 depicts this situation with the assumption that each of the lure lines (40) have a fish (F) snared. The advantage to this invention is that when the fishing line (L) is reeled into the boat (B), all the fish are at the end of the line (L) rather than being sporadically dispersed along the length of the line (L) that was in the water, and to which a lure or hook were attached.

Figure 3A:
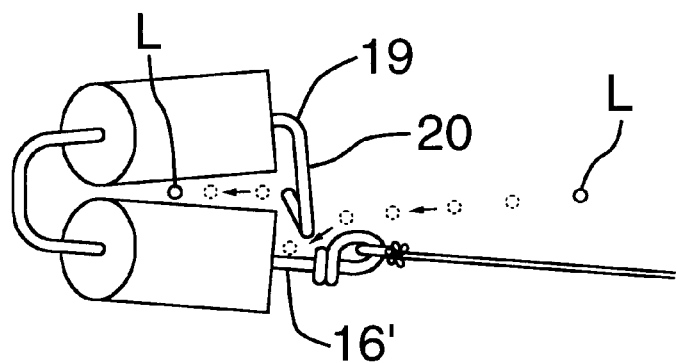
FIG. 3a is a top plan view of the stacker in an open position.
Figure 3B:
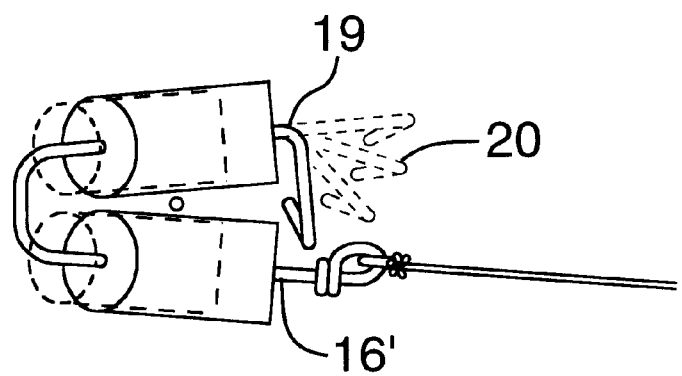
FIG. 3b is a top plan view of the stacker showing movement of the resilient members relative to the rest of the stacker.
Figure 3C:
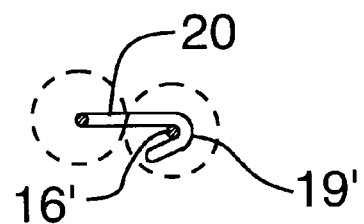
FIG. 3c is a side view of a fastening means of the stacker.

As illustrated in FIGS. 3a, 3b and 3c, closing section (20) is also shaped in a U shape hook (19'). It is this hook (19') that connects onto straight portion (16'). The shape of the hook may be in various other formats and those other formats will still fall within the scope of the present invention.

FIG. 3a shows the stacker in an open position. In the open position, the resilient members (22) naturally bias the opposing arms 16, 17 and their respective lengths to bend away from one another. This allows for the line (L) to be fed into the stacker and positioned in-between the members (22) as shown in FIG. 3a by the dotted feed path.

As shown in phantom in FIG. 3b, bend (20) may be bent at different degrees in order to increase or decrease the pressure on the line (L) by resilient members (22) when the stacker is in a closed position. Also shown in phantom in FIG. 3b, resilient members (22) may be slid toward the proximate arm (18) to also increase the pressure onto the line (L) by resilient members (22).

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A fishing line stacker, for releasing attachment of a fishing line being part of a downrigger fishing tackle system, the stacker providing fishing line releasable engagement means between the fishing line and a fishing hook, the stacker comprising:

a formed loop segment generally formed in a U-shape, with opposite arms interconnected by a proximate arm, where one arm extends to form an extended straight portion having a fish hook connection and the opposite arm extends to form a closing section, which is securable to said extended straight portion, said loop segment having at least one resilient member so that the fishing line may be positioned into the loop segment and constrainingly positioned between the resilient member and said opposite arm so as to hold the stacker in a located position along the fishing line while, at the same time, allowing travelling movement of the fishing line into a free aperture of the loop when a predetermined force is applied to the fishing hook connected to the stacker thereby allowing the stacker to freely float up and down the fishing line.

2. The fishing line stacker as claimed in claim 1, having two opposite resilient members in juxtaposed position thereby adapted to releasingly constrain the fishing line.

3. The fishing line stacker as claimed in claim 1, wherein said at least one resilient member is provided with a forward bevelled face to direct waterflow either above it or below it thereby causing the stacker to migrate up and down the fishing line, as may be desired.

4. A fishing line stacker for use in a fishing line tackle system, said stacker comprising:

a first and second arm defining a closed looped segment at one end of the stacker and being further defined by two opposing line gripping surfaces, each of said surfaces being disposed on said arms;

said arms being positionable between an open position whereat the fishing line may be positioned between said surfaces, and a closed position whereat said surfaces mate one another and hold the fishing line therebetween;

connection means for connecting a lure line or hook at an end opposite the closed loop segment; and, a hook at a free end of said first arm, and an intermediate arm preceding said hook being positionable in a plurality of tension positions to releaseably attach an end opposite the closed loop segment of said first arm to said second arm.

5. A fishing line stacker as claimed in claim 4, wherein said line gripping surfaces are resilient members.

* * * * *